United States Patent [19]

Kurokawa et al.

[11] Patent Number: 4,639,854
[45] Date of Patent: Jan. 27, 1987

[54] HIGH GAIN FEEDBACK CONTROL SYSTEM

[75] Inventors: Kazuo Kurokawa, Ichigayadaimachi; Tadashi Tanaka, Ueda, both of Japan

[73] Assignee: Sanyo Denki Co. Ltd., Kitaotsuka, Japan

[21] Appl. No.: 573,837

[22] Filed: Jan. 25, 1984

[30] Foreign Application Priority Data

Feb. 1, 1983 [JP] Japan .................................. 58-15155

[51] Int. Cl.[4] .............................................. G05B 13/02
[52] U.S. Cl. ....................................... 364/157; 318/611
[58] Field of Search ........................ 364/148, 157, 176; 318/611, 619

[56] References Cited

PUBLICATIONS

DC Motors, Speed Controls, Servo Systems; Electro-Craft Corp.; Hopkins, Minn.; pp. 4-1 to 4-30; 1980.
Feedback and Control Systems [Schaum's Outline Series]; J. DiStefano et al.; McGraw-Hill; 1967, pp. 13, 98, 100, 102, 117-120, 237, 261, 262, 340, and 345-348.
Analysis and Synthesis of Linear Control Systems; C. Chen; Pond Woods Press, Stony Brook, NY; 1978; pp. 103, 104, 121, 180, and 183.

Primary Examiner—Jerry Smith
Assistant Examiner—Allen MacDonald
Attorney, Agent, or Firm—Pearne, Gordon, McCoy & Granger

[57] ABSTRACT

A high gain feedback control system is disclosed which is capable of stably operating without exhibiting any unstable phenomena such as natural frequency. The control system comprises a high gain controller, a controlled system, a detecting means and a summing point, and is constructed in a manner that the detecting function has a transfer function determined to allow a loop transfer function of the control system to have $(n-1)$ zero points when the loop transfer function has n poles, to thereby permit the transfer characteristics to compensate for the transfer characteristics of the controlled system with a time lag. Also, a high gain multi-loop feedback control system is provided which is capable of exhibiting such advantages.

5 Claims, 5 Drawing Figures

HIGH GAIN FEEDBACK CONTROL SYSTEM

BACKGROUND OF THE INVENTION

1. Field of the Invention

This invention relates to an improvement in a high gain feedback control system.

2. Description of the Prior Art

It has been widely known in the art that in a feedback control system the increase in gain of the system generally exhibits advantages such as the increase in response speed, the decrease in steady-state error and the like. Such advantages will be detailedly described hereinafter with reference to FIGS. 1 and 2 which illustrate a conventional high gain feedback control system.

In FIG. 1, reference characters $X(s)$, D and $E(s)$ respectively indicate a reference input, a summing point and a deviation signal. Reference numerals 1, 2 and 3 designate a high gain controller, a controlled system and a detecting means, respectively. $Y(s)$ designates a controlled variable. Also, reference characters $G_1(s)$, $G_2(s)$ and $G_3(s)$ designate transfer functions of the controller 1, controlled system 2 and detecting means 3, respectively. These functions are assumed to have characteristics represented by the following equations:

$$\left. \begin{array}{l} G_1(s) = K_1 \\ \\ G_2(s) = \dfrac{K_2}{1 + T_2 \cdot s} \\ \\ G_3(s) = K_3 \end{array} \right\} \quad (1)$$

wherein $K_1$, $K_2$ and $K_3$ indicate gains of the controller 1, controlled system 2 and detecting means 3, respectively; and $T_2$ and s designate a time constant and an operator (d/dt), respectively.

In the conventional high gain feedback control system constructed in the manner as described above, a closed loop transfer function $G_{01}(s)$ of from the reference input $X(s)$ to the controlled variable $Y(s)$ is represented by the following equation (2):

$$G_{01}(s) = \frac{Y(s)}{X(s)} = \frac{G_1(s) \cdot G_2(s)}{1 + G_1(s) \cdot G_2(s) \cdot G_3(s)} \quad (2)$$

The substitution of the equation (1) for the equation (2) allows the following equation (3) to be obtained:

$$G_{01}(s) = \frac{K_1 \cdot K_2}{1 + K_1 \cdot K_2 \cdot K_3} \cdot \frac{1}{1 + \dfrac{T_2 \cdot s}{1 + K_1 \cdot K_2 \cdot K_3}} \quad (3)$$

In the equation (3), when a transfer function of the control system which is capable of rendering the gain $K_1$ high to meet a relationship of $K_1 \cdot K_2 \cdot K_3 \gg 1$ is designated by $G_{02}(s)$, it is represented by the following equation (4) irrespective of characteristics of the transfer function $G_2(s)$:

$$G_{02}(s) = 1/K_3 \quad (4)$$

Thus, the controlled variable $Y(s)$ is obtained by an equation $Y(s) = X(s)/K_3$. This shows that the conventional high gain feedback control system can fully follow in a manner to allow its response speed to be significantly increased because there is no time lag in the reference input $X(s)$.

Also, the deviation signal $E(s)$ and the transfer characteristics $\epsilon(s)$ from the reference input $X(s)$ to the deviation signal $E(s)$ are represented by the following equations (5) and (6), respectively:

$$E(s) = X(s) - K_3 \cdot Y(s) \quad (5)$$

$$\epsilon(s) = \frac{E(s)}{X(s)} = 1 - K_3 \cdot \frac{Y(s)}{X(s)} = 1 - K_3 \cdot G_{01}(s) \quad (6)$$

This shows that when the gain $K_1$ is rendered high sufficiently to permit the closed loop transfer function $G_{01}(s)$ to be equal to $1/K_3$, as the transfer characteristics $G_{02}(s)$ in the equation (4); the transfer characteristics $\epsilon(s)$ is caused to be zero in the equation (6). This allows the control system to have a steady-state error of zero.

As can be seen from the foregoing, in the conventional high gain feedback control system, when the controlled system 2 having a time lag (time constant: $T_2$) is provided with a high gain feedback, the closed loop control system including the controlled system 2 is allowed to have its response speed significantly increased to render the steady-state error of the control system substantially small. Nevertheless, the conventional high gain feedback control system is encountered with a problem that it often exhibits instability in the actual operation which never allows the control system to carry out the normal operation. Such instability would be due to the fact that a time lag which control elements included in the control system possess is neglected.

The conventional high gain feedback control system will be further described with reference to FIG. 2 which is a block diagram obtained by modifying the block diagram of FIG. 1.

In a control system of FIG. 2, assuming that the transfer function $G_3(s)$ and gain $K_3$ of a detecting means are assumed to be equal to 1 ($G_3(s) = K_3 = 1$), the transfer function $G_{10}(s)$ of a controller 1' is represented by the following equation (8):

$$G_{10}(s) = \frac{K_{10}}{1 + T_{10} \cdot s} \quad (8)$$

wherein $K_{10}$ and $T_{10}$ respectively indicate gain and time constant of the controller 1'. The transfer function $G_{03}(s)$ of a closed loop system in the control system of FIG. 2 having such construction as described above is represented by the following equation (9):

$$G_{03}(s) = \frac{\dfrac{K_{10} \cdot K_2}{(1 + T_{10} \cdot s)(1 + T_2 \cdot s)}}{1 + \dfrac{K_{10}}{1 + T_{10} \cdot s} \cdot \dfrac{K_2}{1 + T_2 \cdot s}} \quad (9)$$

Further, the characteristic equation of the control system is represented by the following equation (10):

$$1 + \frac{K}{(1 + T_{10} \cdot s)(1 + T_2 \cdot s)} = 0 \quad (10)$$

wherein K is indicated by an equation $K = K_{10} \cdot K_2$. The second term of the equation (10) indicates a loop transfer function which is adapted to be utilized for the consideration of stability or instability of the feedback control system. In general, a loop transfer function of a feedback control system is represented by a total product obtained by multiplying all transfer functions included in the closed loop of the control system.

In the present case, there is no root indicating zero point of root loci in the second term of the equation (10) which expresses the loop transfer function. Whereas, roots indicating the poles are $-1/T_{10}$ and $-1/T_2$, respectively. Based on these facts, a consideration will now be made on root loci of the above-mentioned loop transfer function obtained when the value of the gain K described above is varied from zero to infinity on an s-plane which is a complex plane in a root locus stability criterion known as one of stability criteria for a high gain feedback control system. First, assuming that the value of K is zero, the roots indicating poles are $-1/T_{10}$ and $-1/T_2$; thus, these two poles constitute the respective starting points of the root loci. As the value of K is gradually increased toward infinity, the loop transfer function forms root loci extending from the above-mentioned two poles along positive and negative imaginary axes to infinity, respectively. Thus, it will be noted that the conventional high gain feedback control system has a disadvantage that it is unstable sufficient to exhibit natural frequency because its damping ratio becomes zero at the time when the value of K is infinite.

BRIEF SUMMARY OF THE INVENTION

The present invention has been made in view of the foregoing disadvantage of the prior art while taking notice of the fact that a high gain feedback control system including a high gain controller is obtained which is capable of being stabilized by determining the transfer function of a detecting means in the control system so as to allow a loop transfer function of the system to have (n−1) zero points (n being an integer of 2 or more) when the loop transfer function has n poles, so that the system may be kept at a stable operation without exhibiting any unstable phenomena such as natural frequency.

Accordingly, it is an object of the present invention to provide a high gain feedback control system which never exhibits any unstable phenomena such as natural frequency.

It is another object of the present invention to provide a high gain feedback control system which is capable of enhancing a response speed and stably carrying out the decrease in steady-state error.

It is a further object of the present invention to provide a high gain single-loop feedback control system which is capable of stably operated.

It is still a further object of the present invention to provide a high gain multi-loop feedback control system which is capable of being stably operated.

In accordance with the present invention, there is provided a high gain feedback control system including at least a single-loop feedback comprising a controller having a high gain, a controlled system, a detecting means and a summing point; wherein said detecting means has a transfer function determined so as to allow a loop transfer function of said control system to have (n−1) zero points (n being a positive integer of 2 or more) when said loop transfer function has n poles.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters designate like or corresponding parts throughout; wherein.

DETAILED DESCRIPTION OF THE PREFERRED EMBODIMENT

Now, a high gain feedback control system according to the present invention will be described hereinafter with reference to FIGS. 3 to 5.

Figure 1:
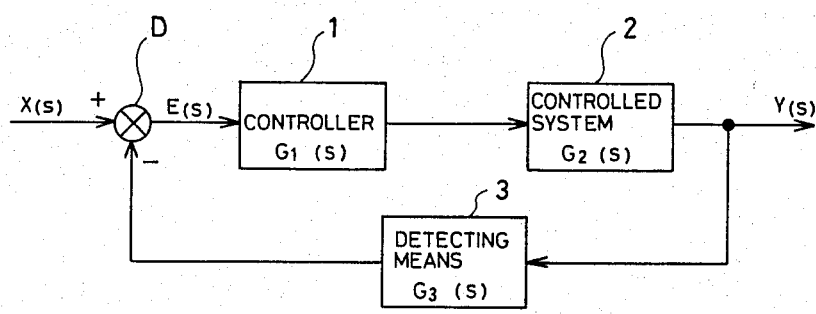
FIGS. 1 and 2 are block diagrams schematically showing a conventional high gain feedback control system.
Figure 2:
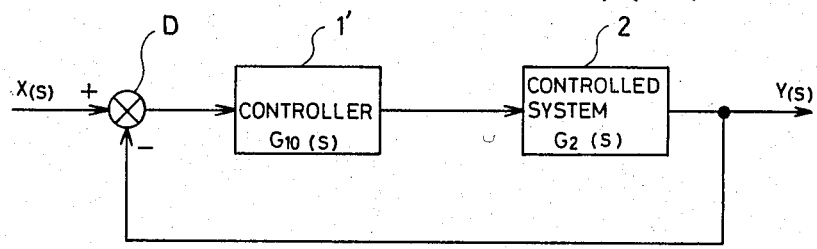
Figure 3:
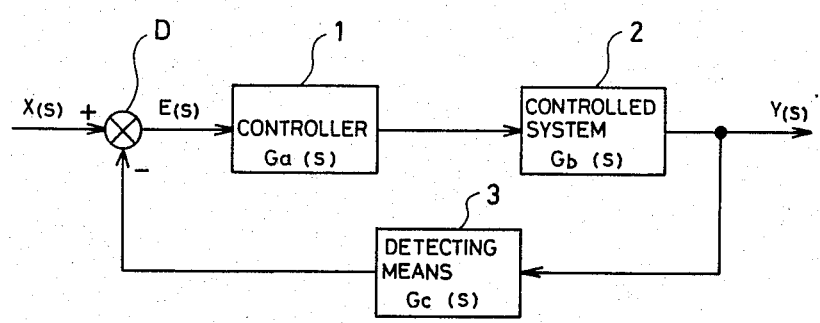
FIG. 3 is a block diagram schematically showing an embodiment of a high gain feedback control system according to the present invention.

FIG. 3 shows an embodiment of a high gain feedback control system according to the present invention, wherein $G_a(s)$, $G_b(s)$ and $G_c(s)$ respectively indicate transfer functions of a controller 1, a controlled system 2 and a detecting means 3 and have such characteristics as represented by the following equations (11), respectively, $$\left.\begin{array}{l} G_a(s) = \dfrac{K_a}{s + \omega_a} \\[2ex] G_b(s) = \dfrac{K_b}{s + \omega_b} \\[2ex] G_c(s) = K_c(s + \omega_c) \end{array}\right\} \quad (11)$$

wherein $K_a$, $K_b$ and $K_c$ respectively indicate gains of the controller 1, controlled system 2 and detecting means 3; s indicates an operator (d/dt); and $\omega_a$, $\omega_b$ and $\omega_c$ respectively indicate break angular frequencies (rad/s) of the controller 1, controlled system 2 and detecting means 3.

Thus, a closed loop transfer function $G_{oo}(s)$ of from a reference input X(s) to a controlled variable Y(s) is given by the following equation (12):

$$G_{oo}(s) = \frac{Y(s)}{X(s)} = \frac{G_a(s) \cdot G_b(s)}{1 + G_a(s) \cdot G_b(s) \cdot G_c(s)} \quad (12)$$

Also, the control system has a characteristic equation represented by the following equation (13):

$$1 + \frac{K_o(s + \omega_c)}{(s + \omega_a)(s + \omega_b)} = 0 \quad (13)$$

wherein $K_o = K_a \cdot K_b \cdot K_c$.

In the second term of the equation (13) representing a loop transfer function of the present control system, a root indicating zero point of root loci of the transfer function is $-\omega_c$, and roots indicating the poles are $-\omega_a$ and $-\omega_b$. So, root loci of the loop transfer function obtained when $K_o$ is varied from zero to infinity on the s-plane of the above-mentioned root locus stability criterion will now be considered. First, when the value of $K_o$ is zero, roots indicating the poles are $-\omega_a$ and $-\omega_b$; thus, these two poles respectively constitute the starting points of two root loci. As the value of $K_o$ is gradually increased toward infinity, one of the root loci approaches a zero point $-\omega_c$ on a negative real axis on the s-plane from one of the poles and the other root locus approaches a point at infinity on a negative real axis on the s-plane from the other pole. More particularly, assuming that a relationship of, for example, $|\omega_a|>|\omega_c|>|\omega_b|$ is established, one of the root loci starts at a point of $-\omega_b$ and terminates at a point of $-\omega_c$ on the negative real axis and the other root loci starts at a point of $-\omega_a$ and extends to a point of infinity on the negative real axis. This allows the control system to be significantly stabilized.

This will be explained by means of an equation, as follows: The arrangement of equation (13) with respect to the s term allows the following equation (14) to be given:

$$s^2+(\omega_a+\omega_b+K_o)s+(\omega_a\cdot\omega_b+\omega_c\cdot K_o)=0 \quad (14)$$

In equation (14), the coefficient $(\omega_a+\omega_b+K_o)$ of the linear term of s is constantly positive; and the discriminant D is as follows:

$$D=(\omega_a+\omega_b+K_o)^2-4(\omega_a\cdot\omega_b+\omega_c\cdot K_o) \quad (15)$$

Thus, D is above zero (D>0) when the value of $K_o$ is infinite in equation (15). This indicates that the high gain feedback control system of the present invention is absolutely stable.

In general, when a loop transfer function of a feedback control system comprising a controller, a controlled system, a detecting means and summing point includes transfer functions of n-th degree having n poles, a transfer function $G_c(s)$ of the detecting means is determined in view of the transfer characteristics of the function $G_c(s)$ to allow the loop transfer function to have $(n-1)$ zero points, as follows:

$$G_c(s)=(s+\omega_{c1})(s+\omega_{c2})\ldots\{s+\omega_{c(n-1)}\} \quad (16)$$

wherein $\omega_{c1}, \omega_{c2} \ldots \omega_{c(n-1)}$ respectively indicate 1 to $(n-1)$ break angular frequencies. The forming of transfer function $G_c(s)$ by $(n-1)$ differential terms and subjecting of the function to phase compensation allows a high gain feedback control system of an absolute stability to be obtained.

The foregoing description has been made with respect to the stabilization of the high gain feedback control system having a single-loop feedback. However, the present invention is also readily applicable to the stabilization of a high gain feedback control system having a multi-loop feedback. The following description will be made with respect to a high gain feedback control system having a double-loop feedback constructed in a manner as shown in FIG. 4 which is one example of a multi-loop feedback.

Figure 4:
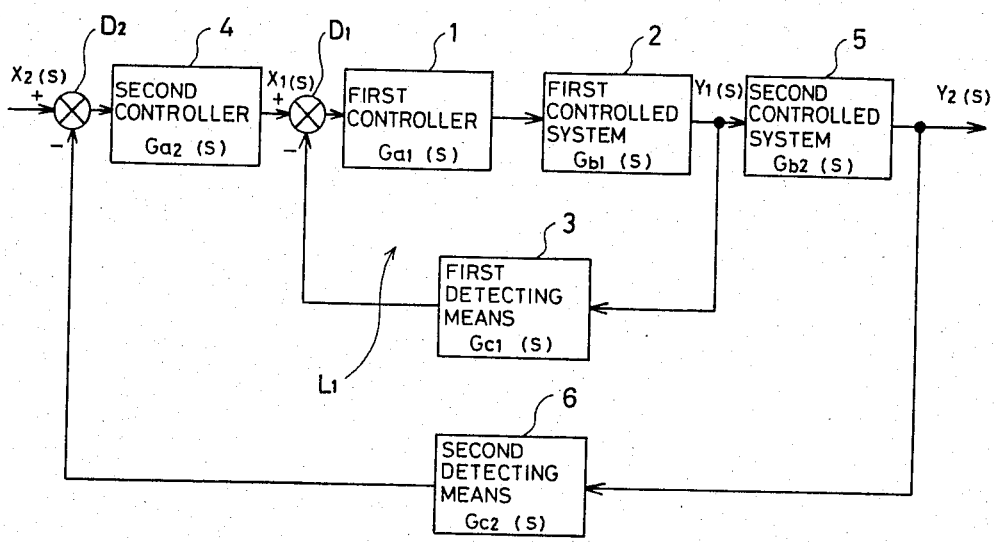
FIGS. 4 and 5 are block diagrams schematically showing another embodiment of a high gain feedback control system according to the present invention.

In FIG. 4, reference characters $X_1(s)$ and $X_2(s)$ respectively indicate first and second reference inputs, $Y_1(s)$ and $Y_2(s)$ respectively designate first and second controlled variables, and $D_1$ and $D_2$ designate first and second summing points, respectively. Also, $G_{a1}(s)$ and $G_{a2}(s)$ respectively indicate transfer functions of first and second high gain controller 1 and 4, and $G_{b1}(s)$ and $G_{b2}(s)$ respectively indicate transfer functions of first and second controlled systems 2 and 5. $G_{c1}(s)$ and $G_{c2}(s)$ designate transfer functions of first and second detecting means 3 and 6.

In the control system constructed as described above, a first closed loop control system $L_1$ extending from the first reference input $X_1(s)$ to the first controlled variable $Y_1(s)$ corresponds to the control system having a single-loop feedback described above with reference to FIG. 3. Thus, the closed loop control system $L_1$ is also rendered absolutely stable in the substantially same manner as described above. More particularly, it is stabilized by forming the transfer function $G_{c1}(s)$ of the first detecting means 3 by $(n-1)$ differential terms and subjecting it to phase compensation to permit it to have $(n-1)$ break angular frequencies $\omega_{c11}, \omega_{c12} \ldots \omega_{c1(n-1)}$, in view of transfer characteristics of n-th degree obtained when a loop transfer function $G_{a1}(s)\cdot G_{b1}(s)\cdot G_{c1}(s)$ of the first closed loop control system includes transfer functions of n-th degree.

Now, a consideration will be made with respect to a transfer function $G_{f1}(s)$ of the first closed loop control system $L_1$.

The transfer function is represented by the following equation (17):

$$G_{f1}(s) = \frac{G_{a1}(s) \cdot G_{b1}(s)}{1 + G_{a1}(s) \cdot G_{b1}(s) \cdot G_{c1}(s)} \quad (17)$$

Figure 5:
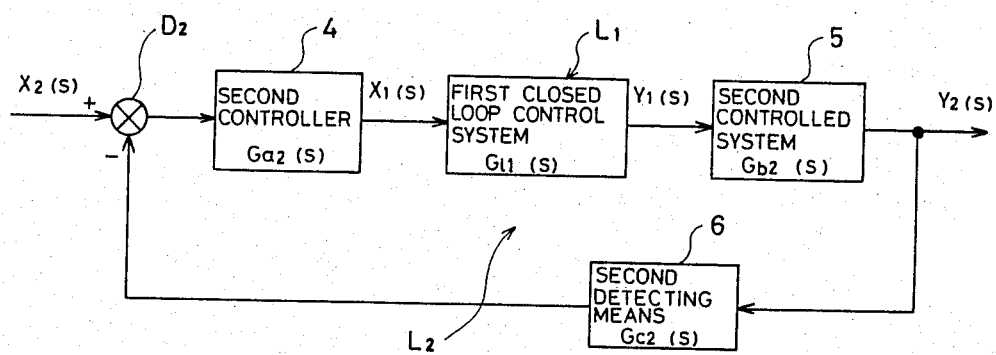

When the first closed loop control system $L_1$ is replaced by $G_{f1}(s)$ in FIG. 4, a block diagram shown in FIG. 5 is obtained. In FIG. 5, when a second closed loop $L_2$ extending from the second reference input $X_2(s)$ to the second controlled variable $Y_2(s)$ has a loop transfer function $G_{a2}(s)\cdot G_{f1}(s)\cdot G_{b2}(s)\cdot G_{c2}(s)$ including transfer functions of n-th degree, the second closed loop control system $L_2$ is also rendered absolutely stable in the substantially same manner as the first closed loop control system $L_1$ or by forming the transfer function $G_{c2}(s)$ of the second detecting means 6 by $(n-1)$ differential terms in view of the transfer characteristics of n-th degree and subjecting the function $G_{c2}(s)$ to phase compensation to allow the transfer function to have $(n-1)$ break angular frequencies $\omega_{c21}, \omega_{c22}, \ldots \omega_{c2(n-1)}$.

A high gain feedback control system having an m-fold loop feedback (m being a positive integer above 2) can be stabilized in the following manner. First, a first closed loop control system constituting a single-loop feedback of the control system is stabilized by providing a first detecting means which is capable of accomplishing phase compensation and has a transfer function of allowing the relationship between the poles and zero points in a loop transfer function of the first closed loop control system to be established in such a manner as described above. Then, a second closed loop control forming a double-loop feedback in the control system is stabilized by providing a second detecting means which is capable of carrying out phase compensation and has a transfer function of allowing the relationship between the pole and zero point in a loop transfer function of the second closed loop control system to be established in the above-mentioned manner. In a similar manner, third, fourth, -----, m-th closed loop control systems may be stabilized; thus, the high gain feedback control system having the m-fold loop feedback may be effectively stabilized.

As can be seen from the foregoing, the high gain feedback control system according to the present invention comprises the high gain controller, controlled system, detecting means and summing point and is constructed in a manner that the detecting means has a transfer function determined to allow the loop transfer function of the control system to have $(n-1)$ zero points when the loop transfer function has n poles; thus, the high gain control system of the present invention is capable of allowing the transfer characteristics of the controlled system with a time lag to be compensated by the transfer characteristics of the detecting means, to thereby stably operate without exhibiting any stable phenomena such as natural frequency. Thus, it will be noted that the high gain feedback control system has an advantage of effectively carrying out the increase in response speed, the decrease in steady-state error and the like. Also, it will be noted that the present invention is capable of providing a high gain multi-loop feedback control system which exhibits such advantages.

While preferred embodiments of the present invention have been described with a certain degree of particularity, obvious modifications and variations are possible in light of the above teachings. It is therefore to be understood that within the scope of the appended claims, the invention may be practiced otherwise than as specifically described.

What is claimed is:

1. A feedback control system comprising:
   at least one closed loop control system having n poles for a loop transfer function with n being a positive integer of 2 or more;
   said closed loop control system comprising a controller having a high gain, said controller receiving a deviation signal E(s) and amplifying said deviation signal;
   a controlled system controlled depending upon an output from said controller;
   a detecting means for detecting a controlled variable Y(s) from said controlled system; and
   a summing point for providing said deviation signal E(s) by summing a reference input X(s) with a detecting output from said detecting means;
   wherein said detecting means has a transfer function determined so as to allow said loop transfer function to have (n−1) zero points.

2. A feedback control system comprising:
   m closed loop control systems, with m being a positive integer of 2 or more, respectively having n poles for each loop transfer function, in which the number (n) of said poles in the respective loop control systems is a positive integer of 2 or more and may be the same or different;
   a first one of said closed loop control systems comprising
      a first controller having a high gain, said first controller receiving a deviation signal E1(s) and amplifying said deviation signal E1(s),
      a first controlled system controlled depending upon an output from said first controller,
      a first detecting means for detecting a controlled variable Y1(s) from said first controlled system, and
      a summing point for providing said deviation signal E1(s) by summing a reference input X1(s) with a detecting output from said first detecting means;
   a second to m-th ones of said closed loop control systems respectively comprising
      second to m-th controllers each having a high gain, said second to m-th controllers receiving deviation signals E2(s) to Em(s) and amplifying said deviation signals to provide reference inputs X1(s) to Xm−1(s) for the first to (m−1)-th closed loop control systems, respectively,
      second to m-th controlled systems controlled depending upon controlled variables Y1(s) to Ym−1(s) from said first to (m−1)-th closed loop control systems, respectively,
      second to m-th detecting means for detecting controlled variables Y2(s) to Ym(s) from said second to m-th controlled systems, respectively, and
      second to m-th summing points for providing said deviation signals E2(s) to Em(s) by summing reference inputs X2(s) to Xm(s) with detecting outputs from said second to m-th detecting means, respectively;
   wherein said first to m-th detecting means each have a transfer function determined so as to allow each of said closed loop transfer functions to have (n−1) zero points.

3. A feedback control system as defined in claim 2, wherein said transfer function $G_c(s)$ of each of said detecting means is represented by the following equation:

$$G_c(s) = (s+\omega_{c1})(s+\omega_{c2}) \ldots \{s+\omega_{c(n-1)}\}$$

wherein $\omega_{c1}, \omega_{c2} \ldots \omega_{c(n-1)}$ each are a break angular frequency.

4. A feedback control system as defined in claim 2, wherein the value of m is 2.

5. A feedback control system as defined in claim 2, wherein said transfer function $G_{cm}(s)$ of each of said detecting means is represented by the following equation:

$$G_{cm}(s) = (s+\omega_{c1})(s+\omega_{c2}) \ldots \{s+\omega_{c(n-1)}\}$$

wherein $\omega_{c1}, \omega_{c2} \ldots \omega_{c(n-1)}$ each are a break angular frequency.

* * * * *